US006590872B1

(12) United States Patent
Shiue et al.

(10) Patent No.: US 6,590,872 B1
(45) Date of Patent: Jul. 8, 2003

(54) RECEIVER WITH PARALLEL CORRELATOR FOR ACQUISITION OF SPREAD SPECTRUM DIGITAL TRANSMISSION

(75) Inventors: Dong-Chang Shiue, Carmel, IN (US); Kumar Ramaswamy, Indianapolis, IN (US); Paul Gothard Knutson, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/176,182

(22) Filed: Oct. 21, 1998

Related U.S. Application Data
(60) Provisional application No. 60/069,345, filed on Dec. 12, 1997.

(51) Int. Cl.$^7$ ................................................ H04Q 7/00
(52) U.S. Cl. ..................... 370/314; 370/321; 370/347; 370/337; 370/442; 375/142; 375/147; 375/150; 375/219
(58) Field of Search ............................... 375/146–148, 375/152, 164, 142–144, 150, 345, 326, 355, 371; 370/204–211, 320–321, 335–337, 347

(56) References Cited

U.S. PATENT DOCUMENTS

| | | | |
|---|---|---|---|
| 4,164,628 A | | 8/1979 | Ward et al. .............. 179/15 BA |
| 5,408,504 A | | 4/1995 | Ostman ...................... 375/354 |
| 5,414,711 A | | 5/1995 | Okada et al. ................. 371/5.1 |
| 5,414,730 A | | 5/1995 | Lundquist et al. .......... 375/208 |
| 5,533,010 A | | 7/1996 | Tanaka .......................... 370/18 |
| 5,590,160 A | | 12/1996 | Ostman ...................... 375/367 |
| 5,629,929 A | * | 5/1997 | Blanchard et al. .......... 370/201 |
| 5,805,648 A | * | 9/1998 | Sutton ........................ 375/367 |
| 5,859,874 A | * | 1/1999 | Wiedeman et al. ......... 375/267 |
| 5,881,056 A | * | 3/1999 | Huang et al. ............... 370/335 |
| 5,909,462 A | * | 6/1999 | Kamerman et al. ......... 375/206 |
| 5,914,949 A | * | 6/1999 | Li .............................. 370/342 |
| 5,936,999 A | * | 8/1999 | Keskitalo .................... 375/200 |
| 5,966,411 A | * | 10/1999 | Struhsaker .................. 375/332 |
| 6,091,718 A | * | 7/2000 | Saunders et al. ........... 370/331 |
| 6,282,228 B1 | * | 8/2001 | Monroe ....................... 375/14 |
| 6,320,903 B1 | * | 11/2001 | Isaksson et al. ............. 375/232 |

OTHER PUBLICATIONS

Roger L. Peterson, Rodger E. Ziemer, and David E. Borth, "Introduction to Spread Spectrum Communications", Chapter 4, "Code Tracking Loops", Prentice Hall, 1995, pp. 149–215.

* cited by examiner

*Primary Examiner*—Douglas Olms
*Assistant Examiner*—Van Nguyen
(74) *Attorney, Agent, or Firm*—Joseph S. Tripoli; Harvey D. Fried; Joseph J. Kolodka

(57) ABSTRACT

A receiver of a handset transceiver, in a wireless telephone system having a plurality of wireless handset and a base unit having a base transceiver. Each handset has a handset transceiver for establishing a time-division multiple access (TDMA) link over a shared channel with the base unit via the base transceiver, in which each handset communicates during an exclusive time slot of a TDMA scheme that allocates time slots to handsets during an exclusive time slot of a TDMA scheme that allocates time slots to active handsets for receiving a spread spectrum signal comprising successive chips representing successive symbols. Each receiver has one or more demodulation loops for demodulating the received spread spectrum signal, wherein each demodulation loop is characterized by one or more demodulation loop parameters. A parallel correlator of the receiver detects a peak bin and provides the peak bin and two adjacent bins. An error estimator of the receiver adjusts the demodulation parameters in accordance with the peak bin and the two adjacent bins to optimize demodulation of the spread spectrum signal.

11 Claims, 8 Drawing Sheets

RECEIVER WITH PARALLEL CORRELATOR FOR ACQUISITION OF SPREAD SPECTRUM DIGITAL TRANSMISSION

This original application claims priority to U.S. provisional application No. 60/069,345, filed on Dec. 12, 1997, in the name of Knutson et al.

BACKGROUND OF THE INVENTION

1. Field of the Invention

The present invention relates to data acquisition or reception and, in particular, to data acquisition in a spread-spectrum, time-division multiplexed multi-line wireless telephone system.

2. Description of the Related Art

Digital data transmission from a transmitter to a receiver requires a variety of digital signal processing techniques to allow the data to be transmitted by the transmitter and successfully recovered or acquired by the receiver. In digital wireless telephone systems, for example, a wireless (cordless) telephone handset unit communicates via digital radio signals with a base unit, which is typically connected via a standard telephone line to an external telephone network. Each handset and the base comprise a transceiver, having a transmitter and receiver. In such a system, a user may employ the wireless handset to engage in a telephone call with another user through the base unit and the telephone network.

Multi-line wireless telephone systems are in use in various situations, such as businesses with many telephone users. Such systems employ a base unit that communicates with up to N handsets in real time, typically with digital communications schemes, such as a spread-spectrum, time division multiplex (TDM) schemes such as time division multiple access (TDMA). In a spread spectrum system, bandwidth resources are traded for performance gains, in accordance with the so-called Shannon theory. The advantages of a spread-spectrum system include low power spectral density, improved narrowband interference rejection, built-in selective addressing capability (with code selection), and inherent channel multiple access capability. Spread-spectrum systems employ a variety of techniques, including direct sequencing (DS), frequency hopping (FH), chirp systems, and hybrid DS/FH systems.

In a TDMA system, a single RF channel is used, and each handset transmits and receives audio data packets as well as non-audio data packets during dedicated time slices or time slots within an overall TDMA cycle or epoch. Other communications schemes include frequency division multiple access (FDMA), code division multiple access (CDMA), and combinations of such schemes. Various modulation schemes are employed, such as carrierless amplitude/phase (CAP) and quadrature amplitude modulation (QAM).

Digital data is typically transmitted as modulated signals over a transmission medium, such as the RF channel, in the form of binary bits of data. (Other transmission media often used for digital communications include asymmetric digital subscriber loop (ADSL) systems or cable modem systems.) The digital data is often modulated and transmitted in complex digital data form, in which the transmitted data comprises symbols from which the original data can be reconstructed by the receiver. Complex digital symbol data typically comprises real (in-phase, or "I") data, and imaginary (quadrature, or "Q") data (I, Q pairs). Each symbol of an I,Q pair may be a multi-bit number, and represent a location of a constellation, mapped against a quadrant. Each symbol is mapped or assigned to a prescribed coordinate in a four-quadrant grid-like constellation using a look-up table (e.g., a ROM). A prescribed number of symbols occupy assigned areas in each quadrant, depending on the encoding scheme. Depending on the number of bits/symbol of a given encoding scheme, each quadrant of the constellation contains a number of symbols at prescribed coordinates with respect to quadrature I and Q axes. For example, in the QPSK encoding scheme, each sample has one of four phase positions, one for each quadrant, so that each symbol pair represents two bits of data.

To transmit a given input data value in a complex data system, the input data value to be transmitted is mapped to a symbol pair or pair of coordinates I,Q of a corresponding constellation point on a complex signal constellation having real and imaginary axes I and Q. These I,Q symbols, which represent the original data value, are then transmitted as part of data packets by a modulated channel. A receiver can recover the I,Q pairs and determine the constellation location therefrom, and perform a reverse-mapping to provide the original input data value or a close approximation thereof.

In a spread spectrum system, each symbol is transmitted by a string of "sub-symbols" or "chips", which is typically derived by multiplying the symbol (which may be either a 1 or −1, in some schemes) times a pseudo-random number (PN) binary string of a certain length (number of chips C). Such systems are thus characterized by a chip rate, which is related to the symbol rate. Spread spectrum systems may also be used, in general, to transmit any digital data, whether in complex format or not, and whether or not in a TDMA system.

In a spread spectrum system, a signal represents successive symbols, by means of successive chips of symbols. A received signal is sampled to provide samples. Samples thus represent a signal, which itself represents chips, which represent symbols. The receiver side of a transceiver samples a received signal with an ADC, which provides samples representative of the signal, which in turn represents symbols. The transmitter side of a transceiver converts symbols into analog samples that constitute a signal, with a digital-to-analog converter (DAC).

As noted above, digital data transmission requires a variety of digital signal processing techniques to allow the data to be transmitted by the transmitter (e.g., the transmitter of the base unit transceiver) and successfully recovered by the receiver (e.g., the receiver of a given handset transceiver). For example, the receiver side of a data transmission in a spread-spectrum digital wireless telephone systems employs a variety of functions to recover data from a transmitted RF signal. These functions can include: timing recovery for symbol synchronization, carrier recovery (frequency demodulation), and gain. The receiver thus includes, inter alia, an automatic gain control (AGC) loop, carrier tracking loop (CTL), and timing loop for each link.

Timing recovery is the process by which the receiver clock (timebase) is synchronized to the transmitter clock. This permits the received signal to be sampled at the optimum point in time to reduce the chance of a slicing error associated with decision-directed processing of received symbol values. In some receivers, the received signal is sampled at a multitude of the transmitter symbol rate. For example, some receivers sample the received signal at twice the transmitter symbol rate. In any event, the sampling clock of the receiver must be synchronized to the symbol clock of the transmitter. Carrier recovery is the process by which a received RF signal, after being frequency shifted to a lower intermediate passband, is frequency shifted to baseband to permit recovery of the modulating baseband information. AGC tracks signal strength and adjusts the gain, for example to help compensate for the effects of transmission channel disturbances upon the received signal. AGC, along with other equalization techniques, can help remove intersymbol interference (ISI) caused by transmission channel disturbances. ISI causes the value of a given symbol to be distorted by the values of preceding and following symbols. AGC is important, therefore, because multiple handsets and/or base stations in close proximity can interfere with one another, and thus the system transceivers must use minimal needed gain to avoid system saturation leading to interference, and also to more efficiently utilize battery power. These and related functions, and related modulation schemes and systems, are discussed in greater detail in Edward A. Lee & David G. Messerschmitt, *Digital Communication*, 2d ed. (Boston: Kluwer Academic Publishers, 1994).

Receivers require a relatively stable source of a sampling clock signal, which is also controllable so that it can be locked to the transmitter symbol clock. Voltage controlled crystal oscillators (VCXO's) have been used for this function, since the clock signal produced by a VCXO is stable but controllable over a relatively narrow range, to allow it to be locked to the transmitter symbol clock. Other types of timing recovery systems may also be employed, such as the "Timing Recovery System for a Digital Signal Processor" described in European Patent Application No. EP 0 793 363, European filing date Feb. 20, 1997, Applicant Thomson Consumer Electronics, Inc., inventors Knutson, Ramaswamy, and McNeely (Knutson et al.).

In a spread spectrum multi-line wireless telephone system, as in all spread spectrum systems, it is important for each transceiver in the system to be able to accurately receive transmitted signals and, in particular, to sample at the appropriate frequency and phase so as to improve signal reception and recovery. In a spread spectrum TDMA system, it is also important for each transceiver to be able to detect a valid data signal and also to detect the guard band indicating the end of the data packet transmission.

SUMMARY

A receiver of a handset transceiver, in a wireless telephone system having a plurality of wireless handset and a base unit having a base transceiver. Each handset has a handset transceiver for establishing a time-division multiple access (TDMA) link over a shared channel with the base unit via the base transceiver, in which each handset communicates during an exclusive time slot of a TDMA scheme that allocates time slots to handsets during an exclusive time slot of a TDMA scheme that allocates time slots to active handsets for receiving a spread spectrum signal comprising successive chips representing successive symbols. Each receiver has one or more demodulation loops for demodulating the received spread spectrum signal, wherein each demodulation loop is characterized by one or more demodulation loop parameters. A parallel correlator of the receiver detects a peak bin and provides the peak bin and two adjacent bins. An error estimator of the receiver adjusts the demodulation parameters in accordance with the peak bin and the two adjacent bins to optimize demodulation of the spread spectrum signal

DESCRIPTION OF THE PREFERRED EMBODIMENT

As described in further detail below, the present invention employs a demodulator architecture in the receiver of the base unit and handsets of the wireless telephone system, which employs a parallel correlator for generating symbols and indices for error estimators of the demodulator architecture. The error estimators use the data generated from the parallel correlator to track/adjust the timing, carrier offset, and AGC loops, so as to optimize or improve signal reception and recovery (acquisition) or demodulation. The present invention also uses the data generated from the parallel correlator to detect a valid data signal and also to detect the guard band indicating the end of the data packet transmission.

Figure 1:
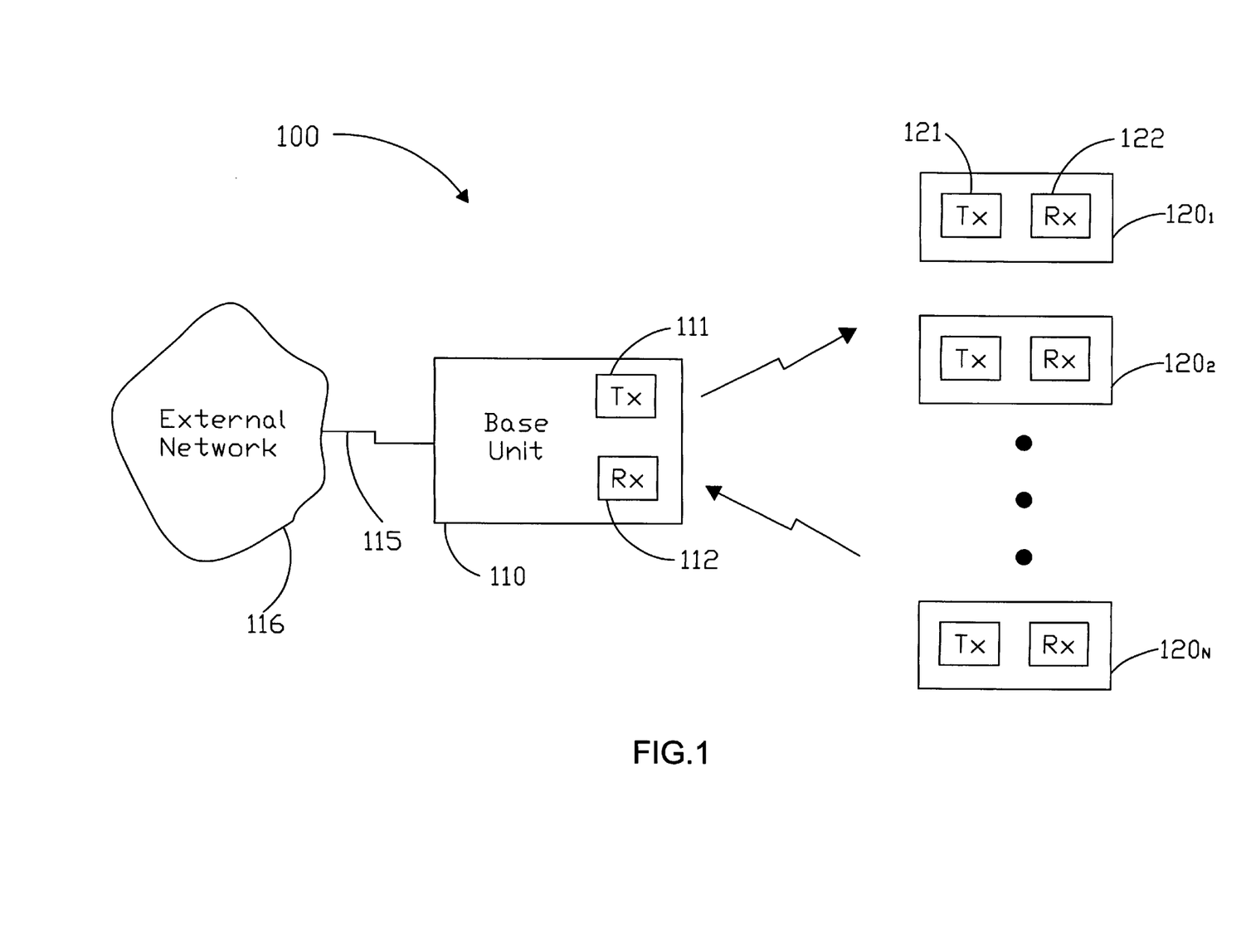
FIG. 1 is a block diagram of spread spectrum TDMA multi-line wireless telephone system, in accordance with an embodiment of the present invention.

Referring now to FIG. 1, there is shown a block diagram of TDMA multi-line wireless telephone system 100, in accordance with an embodiment of the present invention. TDMA system 100 comprises a base unit 110, which has receiver and transmitter units 112 and 111, respectively, and is coupled to external telephone network 116 via telephone line(s) 115. Base unit 110 has a memory or storage device (not shown), such as a RAM or hard disk drive, for storing data. System 100 also comprises N wireless handsets $120_1$, $120_2, \ldots 120_N$. Each has a transmitter and receiver unit (transceiver), such as transmitter 121 and receiver 122 of handset $120_1$. At any given time, some number (or none) of the handsets are operating or off hook (i.e., in the process of conducting a telephone call). System 100 thus provides a wireless network between the base station 110 and each handset $120_i$ ($1 \leq i \leq N$). In one embodiment, system 100 comprises 4 handsets $120_1$–$120_4$, all of which may be active simultaneously. In another embodiment, system 100 comprises a different number of handsets, e.g. N=12, of which up to 8 can be active or operational at a time.

In one embodiment, the present invention comprises a spread spectrum TDMA system for connecting multiple transceivers to a base station over a single RF channel. In particular, system 100 employs a digital spread spectrum TDMA scheme which allows power to be efficiently used since each operating handset is "off" (i.e., not transmitting or receiving data, and thus not using as much battery power) during most portions of the TDMA epoch, and is only "on" during its own time slices or slots. In one embodiment, a handset powers off by switching off power to at least its CPU and transceiver (receiver and transmitter) units, while leaving powered on only a clock and associated timer or watchdog circuitry sufficient to wake up the CPU at a predetermined slot time. In the present invention, the receiver of each transceiver of base unit 110 and each handset 120, employs the demodulator architecture of the present invention to improve signal acquisition. In general, the adjusting of demodulation parameters such as timing, carrier offset, and AGC loops, in accordance with data generated from the parallel correlator (such as the peak bin and adjacent bins) to optimize or improve signal reception and recovery (acquisition), may be referred to herein as optimizing signal demodulation.

Figure 2:
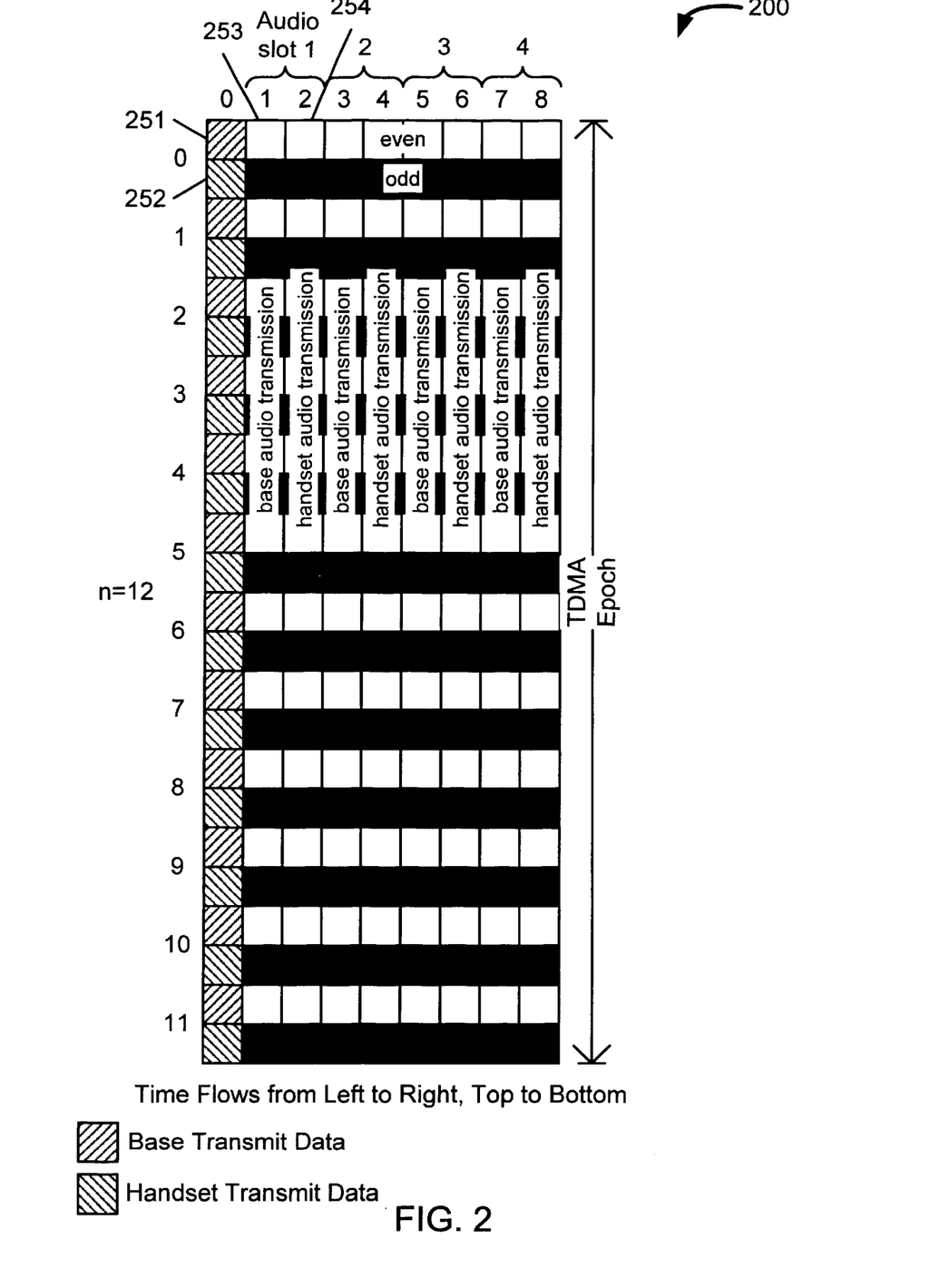
FIG. 2 is a schematic representation of the TDMA slot structure used in the TDMA scheme of the system of FIG. 1, in accordance with an embodiment of the present invention.

Referring now to FIG. 2, there is shown a schematic representation of the TDMA slot structure 200 used in the TDMA scheme 200 of the system of FIG. 1, in accordance with an embodiment of the present invention. System 100 employs a TDMA epoch having structure 200, which is illustrated assuming 12 total handsets $120_1$–$120_{12}$, of which 8 can be active or operational at a time, e.g. handsets $120_1$–$120_8$. TDMA epoch structure 200 comprises a number of rows and columns. Each row of TDMA structure 200 represents a 2 ms field of digital data, and is either even or odd and grouped in a pair with an odd or even, respectively, row or field. TDMA epoch structure 200 is a 48 ms epoch.

In normal mode of operation, each field comprises nine total packets: a (non-audio) data packet in the first column (either transmitted from the base or from a handset) and eight audio packets, grouped in 4 pairs of two. Each such pair of audio packets in a row includes one packet (time slot) of base audio transmission (to a given handset from base unit 110) and one packet of handset audio transmission (from the given handset to the base). Each type of packet contains various sub-fields or sections. For example, a data packet comprises a 32-bit sync field, a data field, a FEC (forward error correction) field, and guard time or band/silence barrier of approximately 5 ms. The data in a data packet is used to communicate between the base unit and a particular handset, and contains various types of information, such as caller ID type information, range and power information, and the like. An audio packet comprises an audio packet header, FEC data section, and guard time. An audio packet header, for example, contains information identifying the audio packet (such as the handset), the current place in the epoch, and the like.

Thus, within each epoch, there is allocated to each handset one pair of data packet slots and several pairs of audio packet slots. The data packet slots are used to establish a "data link" with each respective handset, and the audio packet slots are used to establish an "audio link" with each respective handset. The data links together constitutes the system's data channel, while the audio links constitute the system's audio channel. In other words, the first column of TDMA epoch structure 200 corresponds to the data channel (data links), and the remaining columns correspond to the audio channel (audio links).

The data link for a given handset is used to transmit, via data packets, non-audio data referred to generally herein as signaling information. Each data packet is a set of data transmitted either to a given handset from the base unit or vice-versa, during a discrete time slot during which time no other handsets receive or transmit data over the system's data channel. These data packets may contain various types of data, such as synchronization data or words with time stamp information transmitted to a handset in sleep mode, caller ID information, incoming call information, telephone number being dialed by the handset, and the like. The signaling information conveyed by the data link is used to setup calls, inform the handset of incoming calls, maintaining the communication links between the handsets and base, and the like.

Voice data, i.e. audio packets containing audio data for a real-time telephone conversation, is transmitted over the audio link for a given handset. The bandwidth for the audio link for a handset is much higher than the bandwidth for the data link. This is because, within each epoch, there is allocated to each handset one pair of data packet slots and several pairs of audio packet slots. For example, for N=12 total handsets $120_1$–$120_{12}$ with up to 8 off hook at a time, there are 12 audio packet pairs per handset per epoch, compared to 1 data packet pair per handset per epoch, for an audio channel (or link) bandwidth 12 times greater than the data channel (or link) bandwidth. The audio packets contain digitized (and possibly compressed) voice information.

Thus, for example, row pair 0 comprises an even row and odd row. In the even row, the base transmits data in the first time slot (slot 251), to one of the 12 handsets, e.g. handset $120_1$. There is one row pair in epoch 200 for each handset, so that each handset can receive and transmit data to base unit 110 once per epoch. After the first data slot 251, assuming handset $120_1$ is operational (off hook), an audio packet is transmitted to handset $120_1$ in audio packet slot 253, then an audio packet is transmitted by handset 120, to base unit 110 in audio packet slot 254, and so on for 3 of the other handsets until the end of the field or row. In the odd row for row pair 0, data slot 252 is used to receive data transmitted from handset $120_1$ to base unit 110, and audio packets are transmitted for the remaining active handsets. In row pairs 1–11, the same sequence occurs, except the data packets are to and from different handsets than for row pair 0.

In one mode of operation, each handset receives 16 4-bit ADPCM (adaptive differential pulse code modulation) samples during each time slice of the epoch allocated for the handset to receive audio data; and transmits to the base unit 16 ADPCM samples during each time slice of the epoch allocated for the handset to transmit audio data. In another mode of operation, the number of samples may be doubled to 32 per time slice, by lowering each sample's quality to 2-bit samples. ADPCM and related technical issues are described in detail in International Telecommunication Union (ITU), Recommendation G.727, (12/1990), "5-, 4-, 3- and 2-Bits Sample Embedded Adaptive Differential Pulse Code Modulation (ADPCM),"

The present invention utilizes independent automatic gain control (AGC), carrier tracking loops (CTL), and timing loops for the receiver side of each link, to independently track demodulation parameters and states associated with these three loops or blocks. The states and parameters associated with these three loops and which are adjusted by error estimators, which use indices generated by the parallel correlator, to improve or allow synchronization or acquisition of the received signal are referred to herein, in general, as demodulation parameters.

In a preferred embodiment, the present invention is implemented in a digital system in which the state of the three demodulator loops or blocks (AGC, CTL, and timing) exist in the digital domain. In an alternative embodiment, some analog domains may be utilized.

Figure 3A:
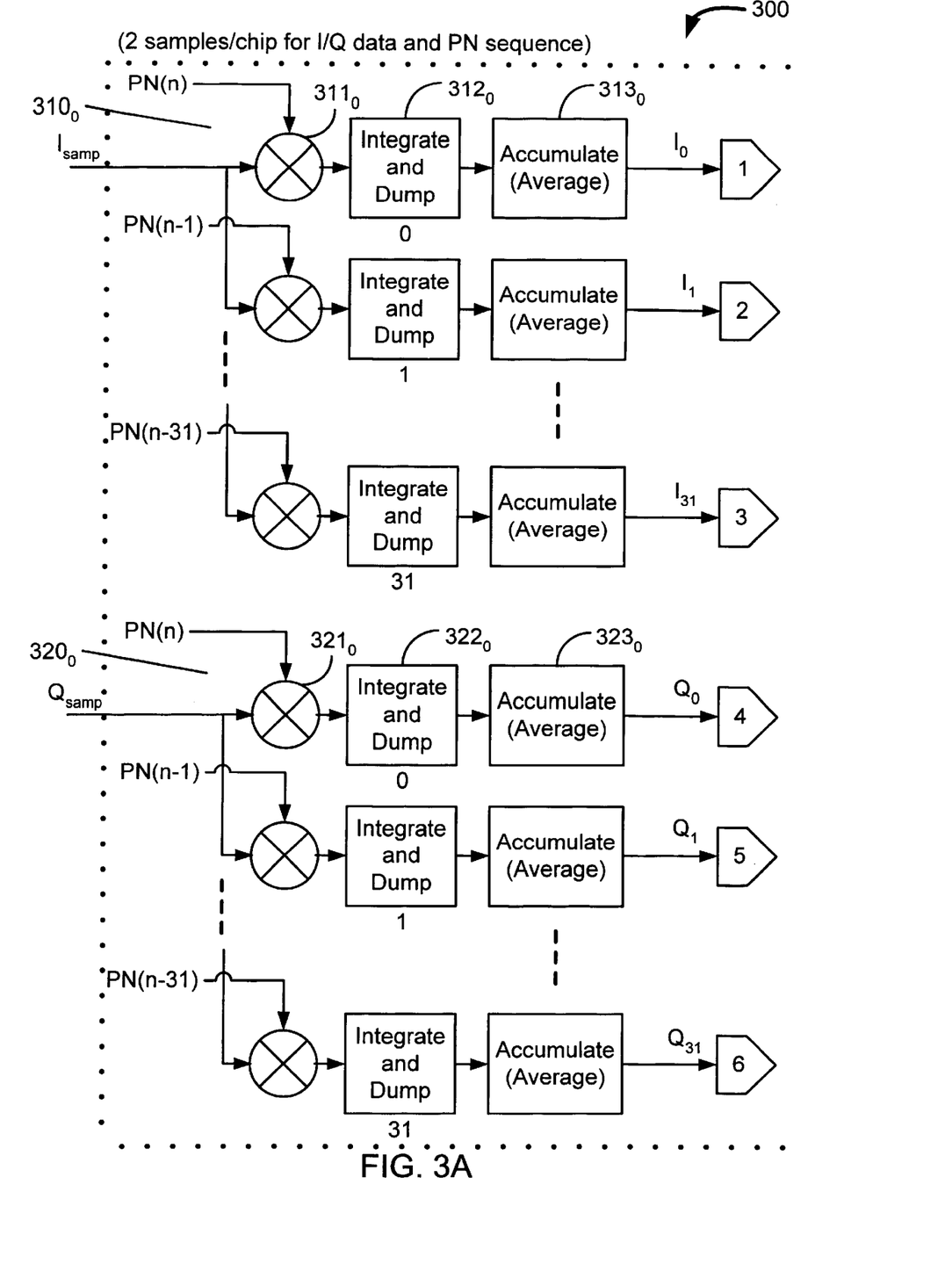
FIG. 3 is a block diagram illustrating a parallel correlator of a transceiver receiver of the system of FIG. 1 in further detail, in accordance with an embodiment of the present invention.
Figure 3B:
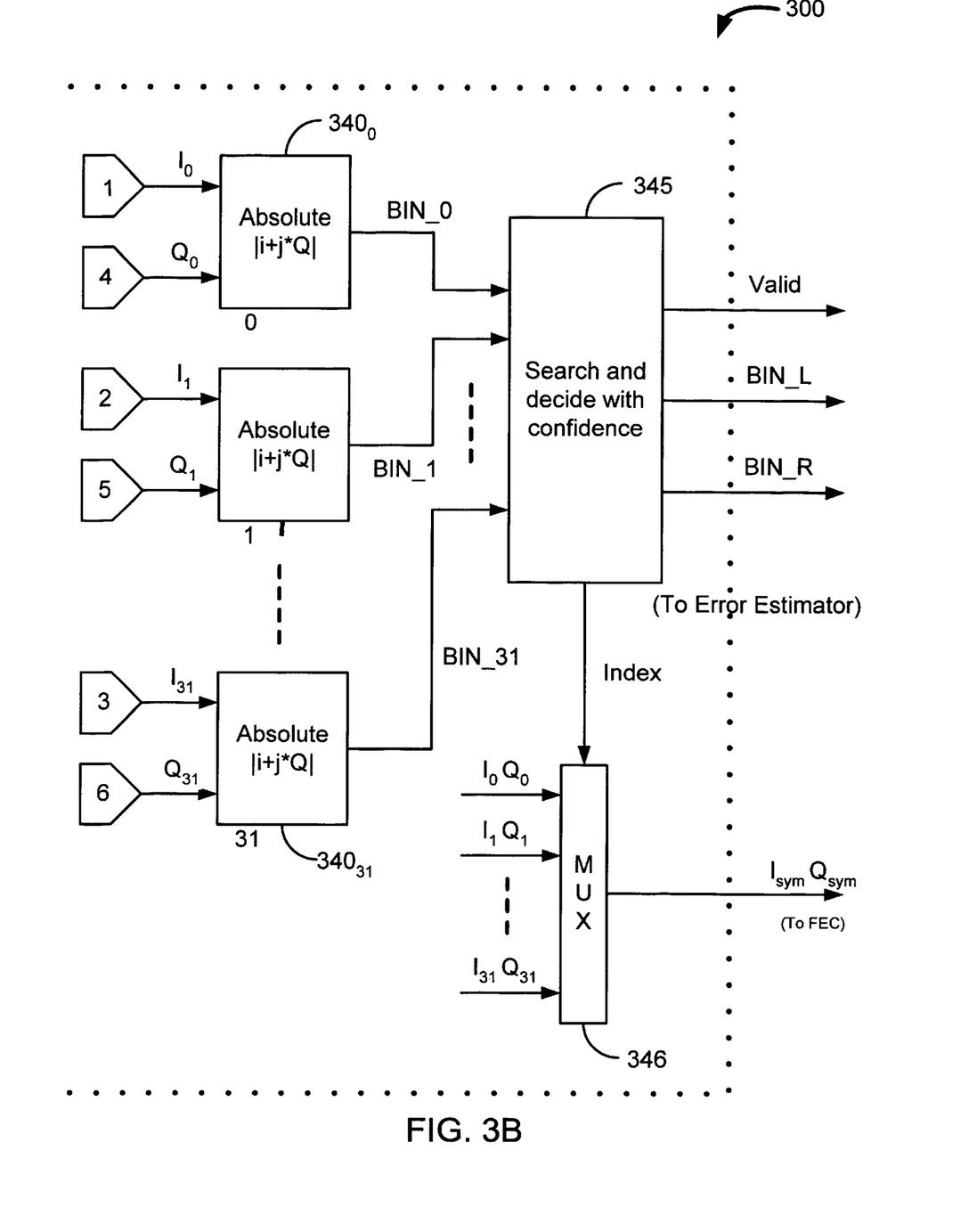
Figure 5:
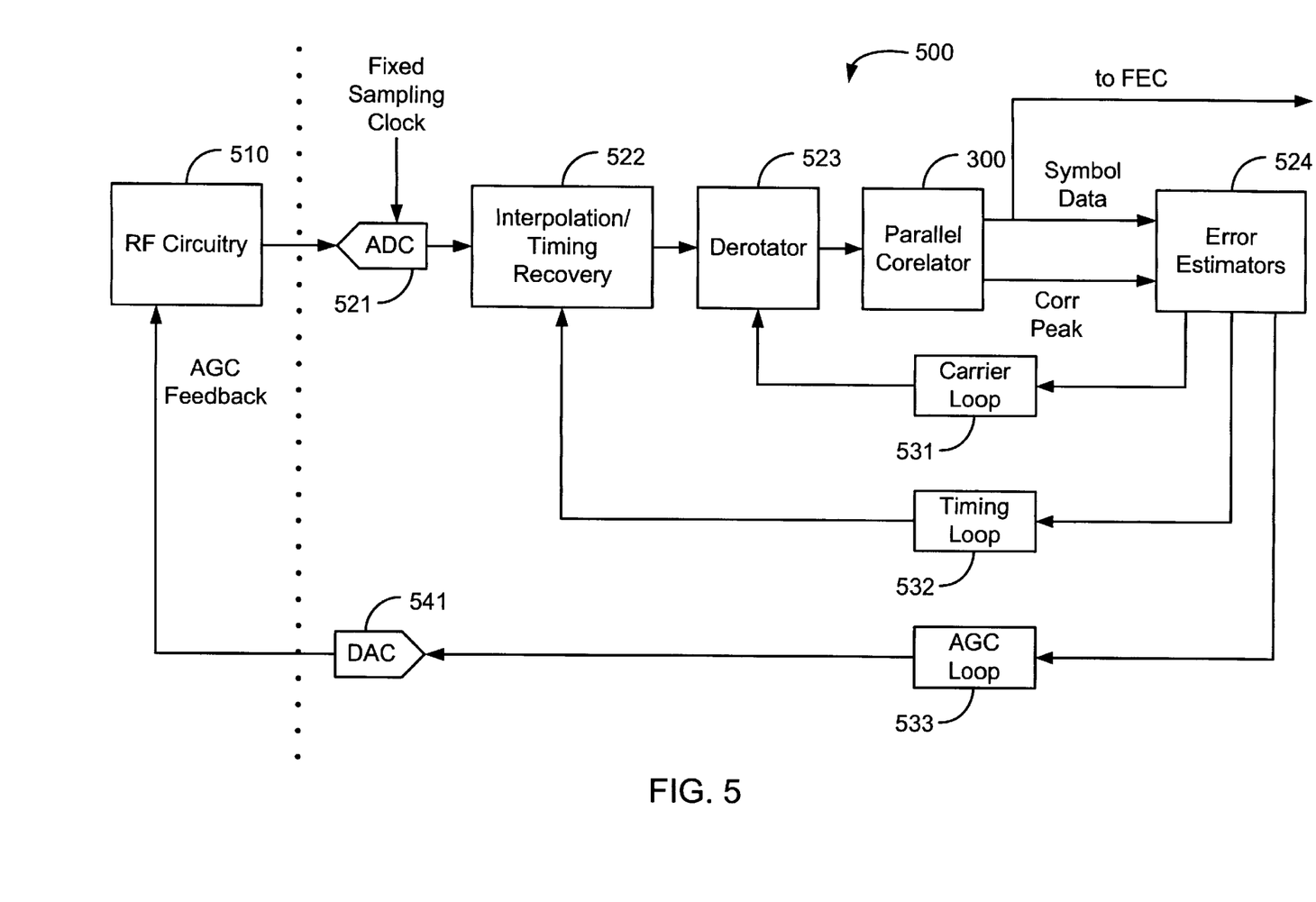
FIG. 5 is a block diagram illustrating the receiver of FIG. 3 in further detail, in accordance with an embodiment of the present invention.

Referring now to FIG. 3, there is shown a block diagram illustrating a parallel correlator 300 of a transceiver receiver of system 100 of FIG. 1 in further detail, in accordance with an embodiment of the present invention. Referring now to FIG. 5, there is shown a block diagram illustrating a receiver 500 comprising parallel correlator 300 of FIG. 3, in accordance with an embodiment of the present invention. Receiver 500 may be a receiver 122 of a handset or receiver 112 of base unit 110, and further comprises RF circuitry 510 for receiving the RF signal, in accordance with AGC feedback from DAC 541 and AGC loop 533, and for providing a near baseband signal to ADC 521. ADC 521 samples the near baseband signal using a fixed clock which is applied thereto, for example, at 2× chip rate.

As will be appreciated, timing error estimation for clock recovery is usually employed in communications systems. Conventional methods of timing recovery include a feedback control system to estimate the timing error based on the incoming signal and filter the error and drive a VCXO to adjust the phase of the locally generated clock. For example, decision timing error estimation is sometimes employed, using non-decision directed techniques like Gardner's algorithm, "A BPSK/QPSK Timing-Error Detector for Sampled Receivers," F. M. Gardner, *IEEE Trans. on Comm.*, May 1986, pp. 423–429. Decision directed techniques like the Müller and Mueller algorithm are also sometimes employed, "Timing Recovery in Digital Synchronous Data Receivers," K. H. Mueller & M. Müller, *IEEE Trans. on Comm.*, May 1976, pp. 516–530. In the present invention, however, error estimators use data generated from the parallel correlator to track/adjust the timing, carrier offset, and AGC loops, so as to improve signal reception and recovery. In particular, interpolation/timing recovery 522 adjusts the sampling phase for symbol synchronization in accordance with timing feedback from timing loop 532; and derotator 523, which derotates the signal and frequency shifts the signal to baseband in accordance with carrier feedback from carrier or CTL loop 531. Derotator 523 thus presents a phase corrected signal to parallel correlator 300. Parallel correlator 300 provides symbol and correlation peak data to error estimators 524, as described in further detail below, based on which error estimators 524 adjust the demodulation parameters for control loops 531, 532, 533 to improve signal acquisition. Timing loop 532 is used to establish sampling synchronization at the receiver, so that sampling occurs at the proper time.

Referring once more to FIG. 3, parallel correlator 300, in one embodiment, comprises an array of 32 I correlators $310_0$–$310_{31}$ and an array of 32 Q correlators $320_0$–$320_{31}$, each of which produces an I,Q pair, such as $I_0$,$Q_0$. 32 correlators are used for I and Q each because a sampling rate of 2× the chip rate is employed, and there are 16 chips/symbol (i.e., the length of the "spreading code" or PN sequence is 16). Thus, each symbol corresponds to 16 chips or 32 samples. In general, the number of correlators is equal to the length of spreading code times the number of samples per chip. Thus, 64 total correlators are shown in FIG. 3. If complex number spreading code is used, only 32 complex correlators total are required, because each chip is repeated once to generate 32 sample chips for 16 PN chips since there are 2 samples per chip. The present invention updates the symbol timing, carrier offset, and AGC at the sample rate with the error signals generated at the symbol rate. As will be appreciated, in alternative embodiments different numbers of PN chips and samples may be employed other than 16, such as 15 or 17.

Each I correlator $310_i$ comprises multiplier node $311_i$, integrate and dump block $312_i$, and accumulate (average) block $313_i$. Each Q correlator $320_i$ comprises similar components. Each product or multiplier node $311_i$ or $321_i$ receives as an input the relevant sample ($I_i$ or $Q_i$, respectively) and the ith binary digit of the PN sequence, $PN_i$.

The I,Q pairs are provided to absolute magnitude summers $340_0$–$340_{31}$, each of which produces a "bin" output $bin_0$–$bin_{31}$. The bins are provided to search and decide with confidence block 345, which provides an index to multiplexer (MUX) 346, and signals valid, $bin_L$, and $bin_R$ to error estimators 524.

As will be appreciated, parallel correlator 300 performs the function of "correlation," by which a "correlation peak" is detected which allows receiver 500 to know the beginning and ends of each chip sequence so that symbols can be derived therefrom. For example, if the receiver system 300 is properly synchronized and receiving a valid signal, $I_2$,$Q_2$ may be the valid symbol pair representing the current symbol being received. In this case, $bin_0$, $bin_1$, $bin_3$, ... $bin_{31}$ will all have a very low value, and $bin_2$ will have a relatively high value or "peak". This is because $I_i$ and $Q_i$, in this example, ideally have a value of ±1, for i={0,1,3, ... 31}, while $I_2$ and $Q_2$ have a value of ±32, because of the effect of multiplication with a properly aligned PN sequence.

As will be appreciated, absolute magnitude is employed by summers $340_i$ because the received signals may be rotating, and have different phases since complex I,Q pairs are used. Summers $340_i$ thus measure the power of the complex signal. Thus, a correlation peak may be detected by search block 345 comparing $bin_0$–$bin_{31}$, even if the received signal has some phase rotation.

As illustrated, MUX 346 receives all 31 I,Q pairs as an input, and selects one of these pairs $I_{sym}$,$Q_{sym}$ to be the acquired symbol, in accordance with the index signal provided by search block 345. In one embodiment, search block 345 determines the index by determining which bin signal is the peak, i.e. relatively highest compared to its adjacent neighbors. For example, in the previous example, $bin_2$ is a peak, and thus the index is 2, so that $I_{sym}$,$Q_{sym}$=$I_2$,$Q_2$. The symbol stream at the output of parallel correlator 300 is applied to a FEC system (not shown). As will be understood, the RF signal received from a remote transmitter is asynchronous from the receiver, and thus may not be sampled by RF circuitry 510, ADC 521, and interpolation/timing recovery 522 of receiver 500 exactly at the proper point of the RF signal. However, because sampling is at 2× the chip rate, in general some peak will be detected by search block 345, even if the relative contrast between the peak and its neighboring bins would be higher had better sampling synchronization been achieved. In the worst case, two neighboring bins will have equal peaks. In this case, one may be selected arbitrarily, and the demodulation parameters adjusted accordingly, as described below.

Search block 345 also provides to error estimators 524 the signals valid, $bin_L$, and $bin_R$. These signals are equal to $bin_p$, $bin_{p-1}$, and $bin_{p+1}$, respectively, where "p" represents the peak bin. Thus, the bin signal for the peak bin is transmitted, along with its immediate "left" and "right" adjacent neighbor bin signals. These signals provided by parallel correlator 300 are used by error estimators 524 to develop error signals used to adjust the respective demodulation parameters that control loops 531, 532, 533, in order to optimize signal demodulation. Error estimators 524 may be a functionality implemented by a processor or by specialized hardware, as will be appreciated.

Thus, error estimators 524 analyze and adjacent bins ($bin_L$, $bin_R$) relative to the sampled correlation peak to adjust timing loop 532 to optimize sample phase timing. Additionally, error estimators 524 analyze the peak bin to adjust CTL loop 531 to optimize derotation. Error estimators 524 also analyze the power of the peak bin to adjust AGC loop 533 to optimize the gain of RF circuitry 510. These changes optimize correlation to increase the robustness of spread spectrum communications.

Figure 6:
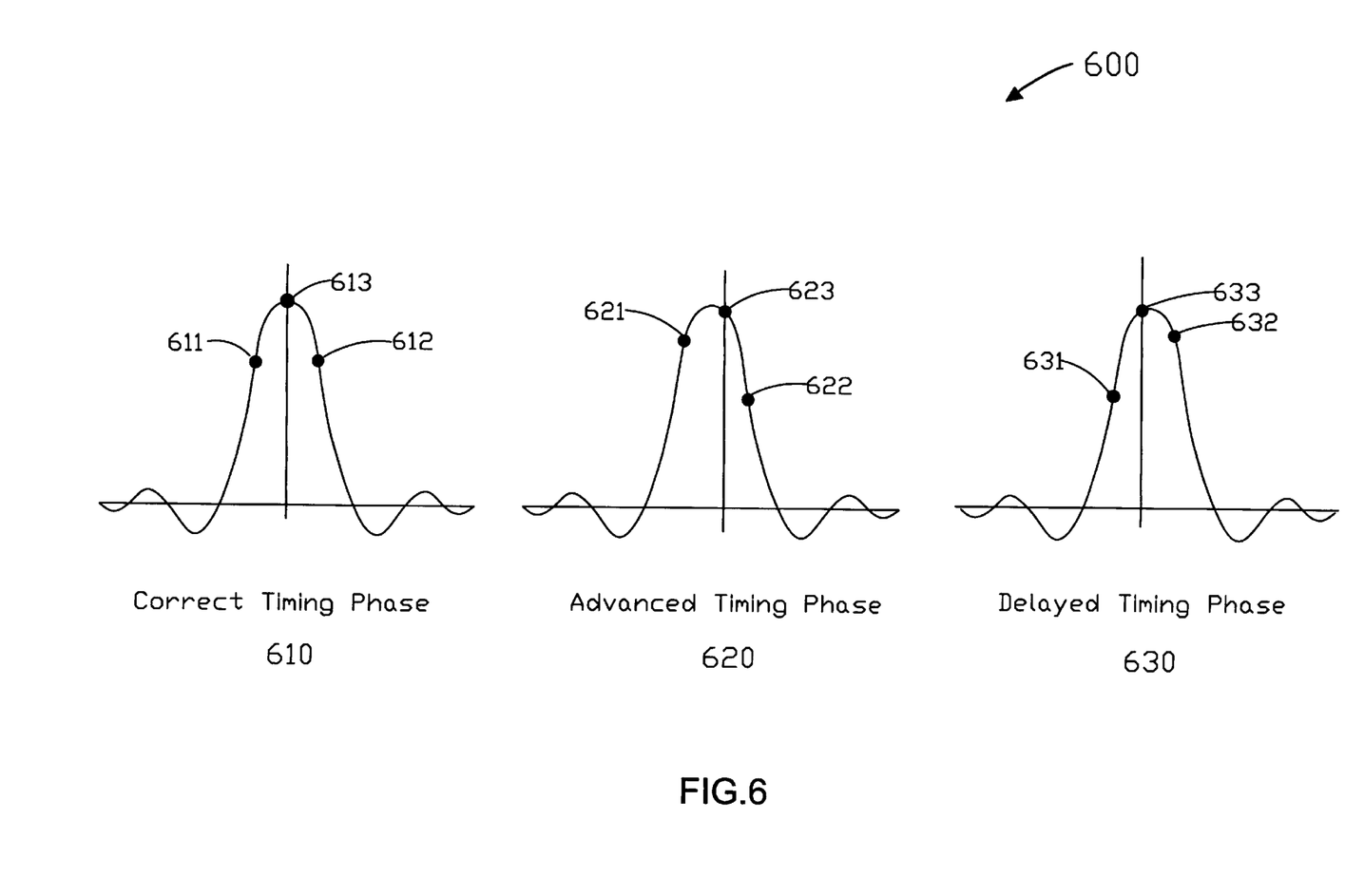
FIG. 6 illustrates exemplary timing phase charts showing correlation peak sampling versus timing error.

With regard to optimized sample phase timing, if demodulation parameters are optimally adjusted, the difference between the peak $bin_p$ and its adjacent bins ($bin_L$, and $bin_R$) will be maximized, and $bin_L$ and $bin_R$ will each differ from $bin_p$ by approximately the same amount. Stated another way, the peak $bin_p$ occurs at the sampled correlation peak when timing is optimally adjusted. Referring now to FIG. 6, there are illustrated exemplary timing phase charts 600 showing correlation peak sampling versus timing error. Correct or optimal timing phase is illustrated in chart 610, advanced timing phase is illustrated in chart 620, and delayed timing phase is illustrated in chart 630. Each chart illustrates the despreading correlation of the received signal, along with its peak value and immediate left and right points, which correspond to $bin_p$, $bin_L$, and $bin_R$. For example, in chart 610, bins 611, 612, and 613 correspond to $bin_1$, $bin_R$, and $bin_p$, respectively. As shown, bins 611 and 612 are symmetrical and both lower than peak bin 613. Where timing phase is advanced and thus suboptimal, however, $bin_L$ (bin 621 of chart 620) has a greater magnitude than does $bin_R$ (bin 622). Similarly, where timing phase is delayed, it is also suboptimal, as illustrated in chart 630.

Thus, in the present invention, $bin_p$, $bin_L$, and $bin_R$ are provided by parallel correlator to error estimators 524. Whenever error estimators 524 detect either advanced or delayed timing phase, error signals are generated to adjust timing loop 532 to achieve correct sample timing phase. In the present invention, therefore, if sample timing phase is either advanced or delayed (not optimized), error estimators 524 provide error signals to adjust the demodulation parameters associated with timing loop 532 in order to maximize $bin_p$, and thus to minimize $bin_L$ and $bin_R$, as well as to equalize $bin_L$ and $bin_R$.

With regard to optimizing derotation, error estimators 524 compare the received peak bin to an optimal or ideal (non-rotating) peak bin, and adjust CTL loop 531 as necessary to achieve more optimal or ideal derotation. With regard to optimal gain, error estimators 524 compare the power of the peak bin to an optimal or ideal power or gain peak bin, and adjust AGC loop 533 as necessary to achieve more optimal or ideal demodulation gain.

Referring once more to FIG. 3, in the present invention, therefore, parallel correlator 300 detects timing/carrier locks and generates symbols/indices for error estimators 524. Error estimators 524 use the data generated from parallel correlator 300 to track/adjust carrier offset, timing, and AGC loops 531, 532, 533. With the implementation of a number of correlators each operating in parallel and correlating with a different sample delayed version of the known PN sequence, the profile (correlation bins) of the received symbol can be obtained at the symbol rate. By employing parallel correlators, the timing error signals needed for ADC 521 sample timing, carrier frequency offsets for derotator 523, and AGC feedback for RF circuitry 510 can all be obtained from the correlation bins (profile) and indices of the parallel correlators at the same time. The present invention thus provides a more efficient and accurate method for estimating the error signals while maintaining the de-spreading processing gain.

In one embodiment, a TDMA system is employed, in which several transceivers are coupled via links to base station 110 over a single RF channel. The present invention preferably employs a technique to maintain existing RF links and establish initial cold-start RF links over the same RF channel, and to determine whether the communication link is locked in symbol timing, carrier frequency tracking, and AGC.

Figure 4A:
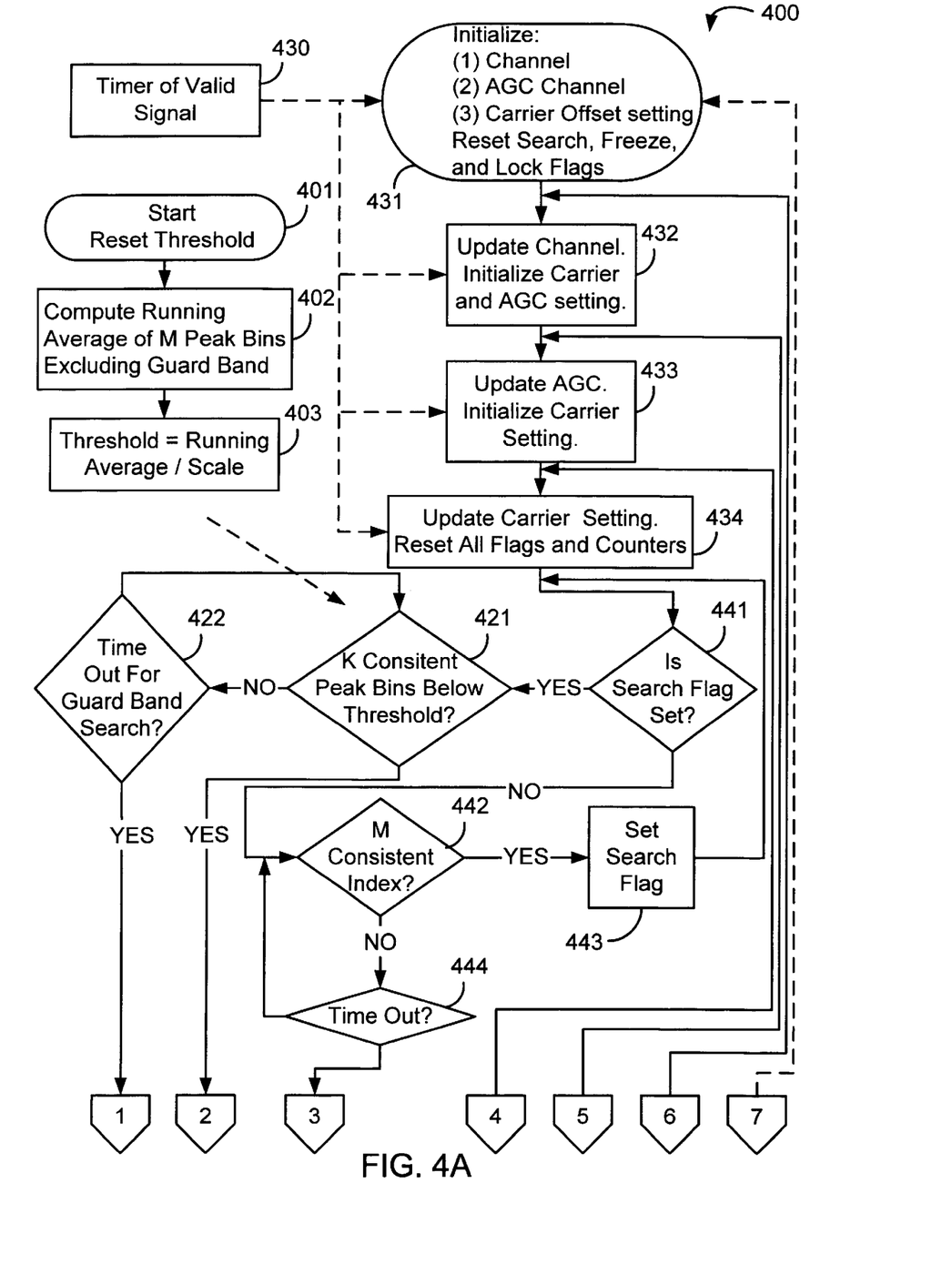
FIG. 4 is a flow diagram illustrating the method of operation of the receiver of FIG. 3, in accordance with an embodiment of the present invention.
Figure 4B:
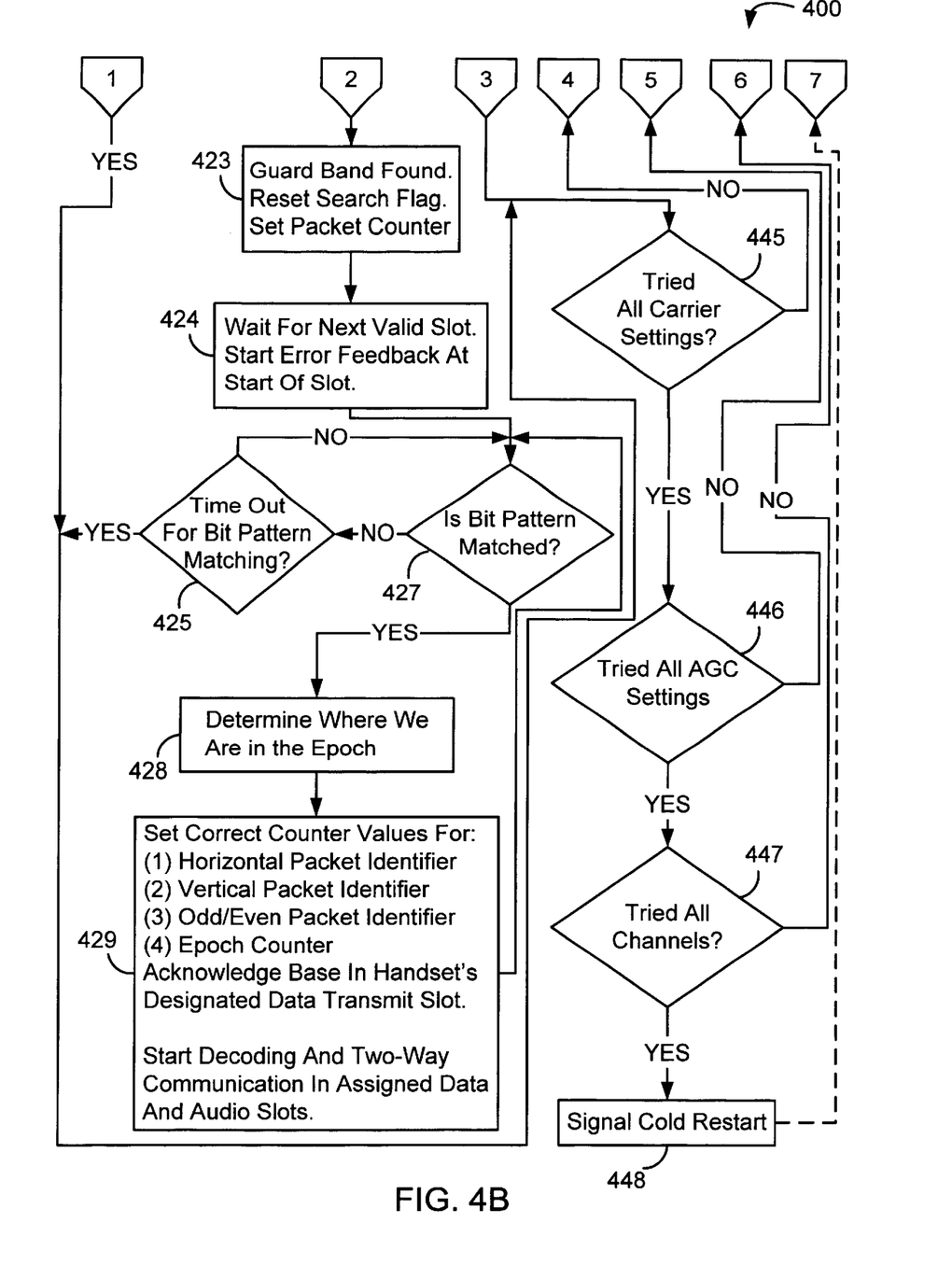

Referring now to FIG. 4, there is shown a flow diagram illustrating the method of operation 400 of the receiver of FIG. 3, in accordance with an embodiment of the present invention. Method 400 provides a technique for determining whether the communication link has been established in symbol timing, carrier tracking, and AGC (whether there is a valid data signal), and also for detecting the guard band indicating the end of the data packet transmission. Guard band detection is important for cold starts and efficient switching between signals, and allows synchronization of the handset to the base station in the correct TDMA epoch position on cold start.

In a TDMA system, in which some handsets are only supposed to be "on" during their respective TDMA epoch time slots, method 400 of the present invention also allows for locking to the proper transceiver of system 100. This latter is achieved because each handset transceiver is able to detect when there is a valid data signal being received at the beginning of its time slot, and also can detect the guard band indicating the end of the data packet transmission. This allows the handset to turn off for a specified clocked time (typically employing a watchdog timer) and to "wake up" again at the beginning of its next slot in the TDMA epoch.

Some time prior to data reception or simultaneous with initialization, a peak detection threshold has been computed by resetting the threshold and computing a running average of M (e.g., 5) peak bins, not counting the guard band (steps 401, 402). The threshold is then computed as the running average of the previous M peak bins and is then scaled to be an order of magnitude smaller (step 403).

At the beginning of a given transceiver's data slot, its watchdog timer wakes up the transceiver and it begins to initialize; alternatively, initialization may begin when a valid signal is received (steps 430, 431–434). After initialization and the peak detection threshold has been determined, method 400 determines whether valid data is being received or whether the guard band has been encountered. As long as valid data is being-received, operation is proceeding satisfactorily. If too many errors are detected, steps are taken to attempt to lock. If a guard band is detected, the transceiver can active a countdown timer and deactivate until its next data or audio slot.

Thus, after initialization, if the search flag (searching for the guard band) is not set, then the method looks for a time period for M peaks (steps 441, 442, 444), to determine if there is valid data being received yet. If no valid data is detected before the time out, then different carrier, AGC, or channel settings are tried and partial initialization is done (steps 444–447), or a cold restart if necessary (step 448). Advantageously, the searching for M peaks (or K non-peaks) is done at the symbol rate, since parallel correlator 300 provides all correlation bins for each symbol. Thus, in one embodiment, method 400 searches for the consistency of the correlation peak bin indices. In particular, over the span of N symbols, if M consecutive correlation peak bins are located at the same index (if there exist M consecutive correlation peak bins at the same index, e.g., $bin_2$ is a peak for more than M consecutive times), an initial lock can be declared.

If M peaks are detected, indicating valid data, then the search flag is set and method 400 begins searching for the guard band by looking for K consistent peak bins below the peak detection threshold (steps 442, 443, 441, 421). The search for K peak bins below the threshold continues until a time out is reached, at which point different carrier, AGC, or channel settings are tried (steps 422, 445–447). If K peaks are detected, then the guard band is found and various flags and counters are reset, since the data packet transmission is ending (steps 421, 423). The transceiver then enters wait mode, until its next data packet transmission slot occurs. At the beginning of the next data slot, the transceiver begins reception of data again, and parallel correlator 300 provides the $bin_P$, $bin_L$, and $bin_R$ data to error estimators 524, to adjust the demodulation parameters for loops 531, 532, and 533 if necessary. At this stage, the CTL loop 531 corrects frequency offset and timing recovery loop 532 corrects timing errors. AGC loop 533 then tracks any signal strength fluctuations.

In order to obtain link lock with more confidence, in one embodiment, a bit pattern matching is executed to match the decoded bits with some known bit patterns, e.g. a data packet header (steps 421, 423, 424, 427). A false lock will be asserted if the bit pattern matching is not achieved within some pre-determined time frame (step 425). At this point, the process starts over by going through the steps of signal gains (AGC) and local carrier frequencies (steps 445–447). If the decoded bit pattern matches one of the stored/known bit patterns, the RF link is established (step 427), and it is then determined where the system is in the TDMA epoch (step 428), and proper counter values are set and other TDMA epoch handshaking takes place (step 429). Step 429 leads to the processor implementing steps 431 et seq., at which point the CTL loop 531 corrects frequency offset and timing recovery loop 532 corrects timing errors. AGC loop 533 then tracks any signal strength fluctuations.

Once the error signals are declared valid, symbol timing and carrier tracking loops 531, 532, which are operating as closed loops, will correct any offsets in timing and carrier frequency. Of course, correlation peak bins can still be obtained even when there are some offsets in symbol timing and carrier frequency. In one embodiment, the carrier frequency can be off as far as 100 KHz and still produce a correlation peak bin.

If M consistent peak bins at a given index are detected (step 442), a search flag is set to indicate that there possibly exists a relevant packet of data (step 443). The search flag causes a guard band search block to point to the packet boundary. The threshold value from step 403 is used to decide whether a guard band has been found after the search/freeze flags are set. This value is calculated from the average of the previous M peak bins and is scaled to be an order of magnitude smaller. Because system 100 is a TDMA system, a counter may be set up so that it is known when the next possible relevant data packet will arrive. The next packet of data will then be used to generate error signals and be decoded for identification. Once the correct identification (or bit pattern matching), is achieved, the various counters used to point to the right time slots are set by the microprocessor.

If the correct identification can not be obtained, a time-out is asserted and causes local carrier frequency (LO) or AGC loops to be stepped to another value, e.g., step of 50 KHz for LO and 10 dB for AGC. The searching for M consistent indices and guard band are also restarted. Confidence meters can be built into each one of these blocks to ensure high probability of establishing RF links. For instance, the search and freeze flags are set only after we have obtained 3 consecutive M consistent indices. It should be noted that the duration for searching for consistent index should last at least two fields. This is due to the fact that the base station 110 will transmit data every other field, as shown in FIG. 2, even when no handset is active.

This operation is orchestrated by a microprocessor, i.e., after the initial lock is obtained, the microprocessor can provide some parameters or values for bit pattern matching operation. The initial lock is achieved by hardware while the final lock declaration is determined one layer up by the micro. Once the link is established, the various counters used to point to the right slots and frames in a TDMA system are set to the correct numbers determined by the micro.

In addition to digital communications of a wireless telephone system as described hereinabove, the present invention is also applicable to BPSK, QPSK, CAP and QAM, for example, as well as to VSB modulation systems such as employed by the Grand Alliance High Definition Television (HDTV) system proposed for use in the United States. One skilled in the art will recognize what design changes are required to adapt the disclosed transmitter modulation system to the desired modulation scheme, and will understand how to design the illustrated components to operate with the desired modulation scheme.

One skilled in the art will recognize that the wireless system described above according to the principles of the invention may be a cellular system where base unit 110 represents a base station serving one of the cells in a cellular telephone network.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A receiver for receiving a spread spectrum signal comprising successive chips representing successive symbols, the receiver comprising:

(a) one or more demodulation loops for demodulating the received spread spectrum signal, wherein each demodulation loop is characterized by one or more demodulation loop parameters;

(b) a parallel correlator for detecting a peak bin and for providing the peak bin and two adjacent bins; and (c) an error estimator for adjusting the demodulation parameters in accordance with at least one of the peak bin and the two adjacent bins to optimize demodulation of the spread spectrum signal, wherein each handset comprising a handset transceiver for establishing a time-division multiple access (TDMA) link over a shared channel with the base unit via the base transceiver, in which each handset communicates during an exclusive time slot of a TDMA scheme that allocates time slots to handsets during an exclusive time slot of a TDMA scheme that allocates time slots to active handsets.

2. The receiver of claim 1, wherein the receiver is part of a handset transceiver of a wireless handset of a wireless telephone system comprising the wireless handset, a plurality of other wireless handsets, and a base unit having a base transceiver for communicating over an RF channel with each handset.

3. The receiver of claim 1, further comprising a processor having means for searching for M consecutive peak bins above a threshold to determine if the receiver is receiving valid data, and means for searching for K consecutive peak bins below the peak threshold to determine if the receiver is receiving guard band data.

4. The receiver of claim 3, wherein the receiver begins a countdown timer and switches off at the end of a data packet transmission and wakes up at a next time slot for the handset in accordance with the countdown timer.

5. The receiver of claim 1, wherein the one or more demodulation loops comprise an automatic gain control (AGC) loop, carrier tracking loop (CTL), and timing loop.

6. The receiver of claim 5, wherein the error estimator determines whether the adjacent bins are unequal, and adjusts the timing loop in accordance with a sampled correlation peak and adjacent bins in order to equalize the adjacent bins.

7. The receiver of claim 5, wherein the error estimator compares the peak bin to an optimal non-rotating peak bin and adjusts the CTL according to the comparison in order to optimize derotation of the signal.

8. The receiver of claim 5, wherein the error estimator compares a power measurement of the peak bin to an optimal power measurement and adjusts the AGC loop according to the comparison in order to optimize signal gain.

9. The receiver of claim 1, wherein each loop is characterized by one or more demodulation loop parameters and the error estimator adjusts the loops by adjusting the demodulation parameters in accordance with error signals developed in accordance with the peak bin and the at least two adjacent bins.

10. The receiver of claim 1, further comprising a processor having means for searching for M consecutive peak bins above a peak threshold to determine if the receiver is receiving valid data.

11. The receiver of claim 10, the processor further comprising means for searching for K consecutive peak bins below the peak threshold to determine if the receiver is receiving guard band data.

* * * * *